(12) United States Patent
Brandmeier et al.

(10) Patent No.: US 10,462,967 B2
(45) Date of Patent: Nov. 5, 2019

(54) MEASURING DEVICE FOR MEASURING A MASS FLOW COMPOSED OF BULK MATERIAL

(71) Applicant: CLAAS Selbstfahrende Erntemaschinen GmbH, Harsewinkel (DE)

(72) Inventors: Jonas Brandmeier, Harsewinkel (DE); Gunnar Quincke, Soest (DE); Roger Helmut Koitzsch, Bielefeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 107 days.

(21) Appl. No.: 15/718,402

(22) Filed: Sep. 28, 2017

(65) Prior Publication Data

US 2018/0084720 A1    Mar. 29, 2018

(30) Foreign Application Priority Data

Sep. 29, 2016  (DE) .................. 10 2016 118 560

(51) Int. Cl.
*A01D 41/127*  (2006.01)
*A01C 7/10*  (2006.01)
(Continued)

(52) U.S. Cl.
CPC ......... *A01D 41/1272* (2013.01); *A01D 61/04* (2013.01); *G01F 1/206* (2013.01); *G01F 1/30* (2013.01); *G01F 3/24* (2013.01)

(58) Field of Classification Search
CPC .............. A01C 7/105; A01D 41/1272; A01D 41/1277; A01D 61/04; G01F 1/206; G01F 1/30; G01F 1/66; G01F 1/80; G01F 3/24
(Continued)

(56) References Cited

U.S. PATENT DOCUMENTS 4,765,190 A * 8/1988 Strubbe .............. A01D 41/1271
222/71
5,343,761 A   9/1994 Myers
(Continued)

FOREIGN PATENT DOCUMENTS

DE      195 41 167 A1    5/1997
EP      0 853 234 A1     7/1998
EP      0 1 169 905 A1   1/2002

OTHER PUBLICATIONS

European Search Report for related EP Application No. 17189913.1, dated Feb. 22, 2018, 8 pgs.

*Primary Examiner* — Robert E Pezzuto
(74) *Attorney, Agent, or Firm* — Lempia Summerfield Katz LLC

(57) ABSTRACT

A measuring device is provided for measuring a mass flow composed of bulk material, in particular grain, in a continuous, circulating conveyor enclosed in part by a housing, having planar conveyor elements, which conveys the bulk material from a lower bulk material receiving area to a higher bulk material delivery area. A substantially circular movement course is imposed on the bulk material delivered by the respective conveyor element in a substantially radial direction of an inner surface of a cover section of the housing by a guide surface formed in the upper region of the conveyor. The bulk material is deflectable toward a sensor surface of the measuring device. At least the sensor surface of the measuring device is disposed in the upper region of the conveyor such that there is a tangential course in the transition from the guide surface to the sensor surface.

18 Claims, 4 Drawing Sheets

(51) Int. Cl.
  *A01D 61/04*  (2006.01)
  *G01F 1/30*  (2006.01)
  *G01F 1/20*  (2006.01)
  *G01F 3/24*  (2006.01)

(58) Field of Classification Search
  USPC ......... 56/10.2 R, 10.2 D, 10.2 G; 73/861.72, 73/861.73; 198/312; 460/1, 4, 6, 22
  See application file for complete search history.

(56) References Cited

U.S. PATENT DOCUMENTS

| | | | |
|---|---|---|---|
| 5,686,671 A | | 11/1997 | Nelson et al. |
| 5,736,652 A | * | 4/1998 | Strubbe .............. A01D 41/1271 |
| | | | 73/861.73 |
| 5,750,877 A | | 5/1998 | Behnke et al. |
| 5,959,218 A | | 9/1999 | Strubbe |
| 6,899,616 B1 | * | 5/2005 | Murray .................. A01D 75/28 |
| | | | 460/6 |
| 9,144,195 B2 | * | 9/2015 | Koch .................. A01D 41/1272 |
| 9,506,786 B2 | * | 11/2016 | Strnad ................ A01D 41/1272 |
| 9,645,006 B2 | * | 5/2017 | Phelan ................ G01F 25/0046 |

\* cited by examiner

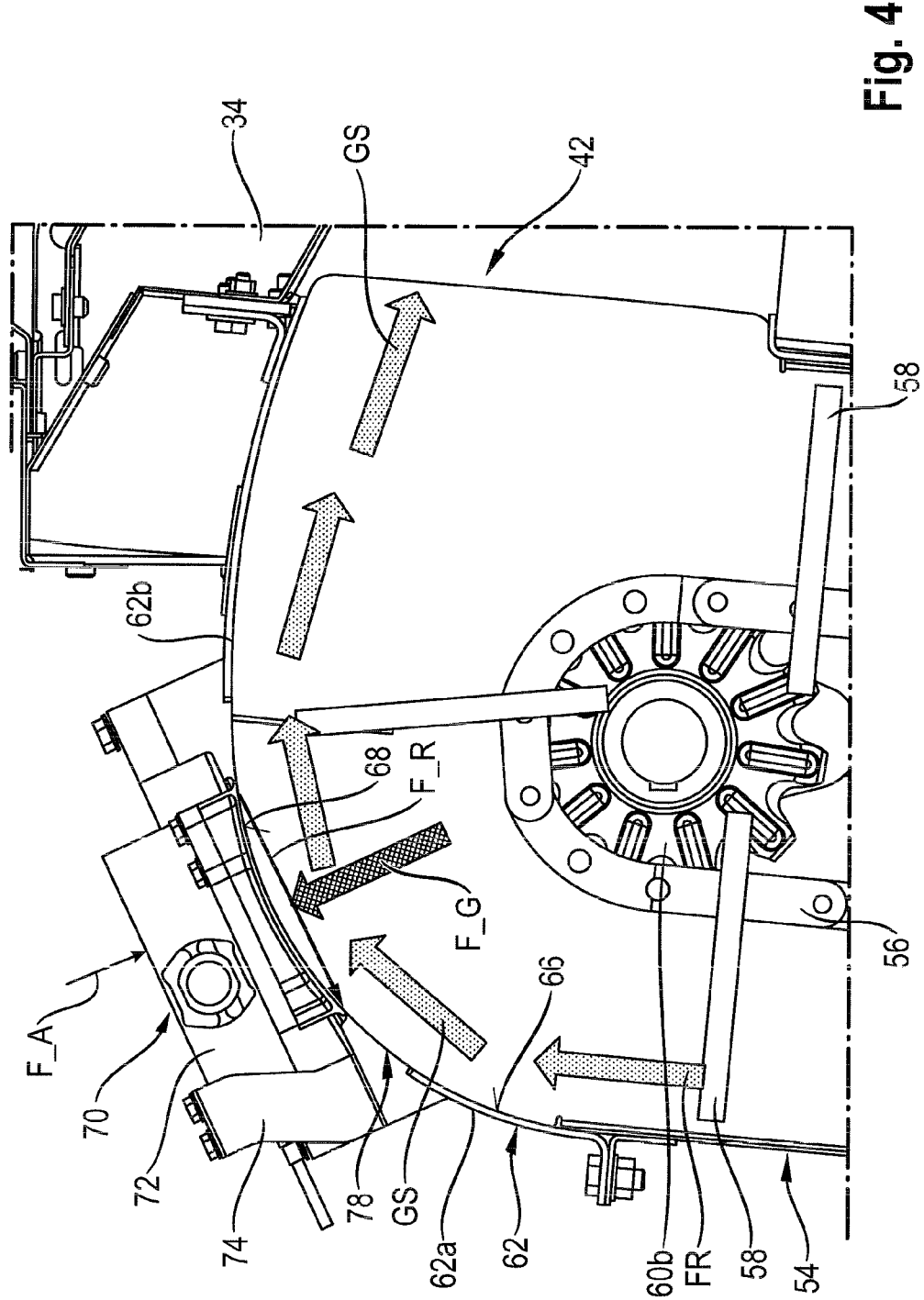

MEASURING DEVICE FOR MEASURING A MASS FLOW COMPOSED OF BULK MATERIAL

CROSS REFERENCE TO RELATED APPLICATIONS

This application claims priority to German Patent Application No. DE 102016118560.4, filed Sep. 29, 2016, the entire disclosure of which is hereby incorporated herein by reference.

FIELD OF THE INVENTION

The present disclosure relates to a design of a measuring device, as well as a combine harvester incorporating such a device.

BACKGROUND

A design of a measuring device and a combine harvester are known from EP 1 169 905 A1. A design of a measuring device for measuring a mass flow composed of bulk material, in particular grains, is described therein. The bulk material is conveyed by means of a continuous, circulating conveyor, partially enclosed by a housing, having planar conveyor elements, from a lower bulk material receiving area to a higher bulk material delivery area. A substantially circular movement is imposed on the bulk material released from the respective conveyor element in the radial direction of an inner surface of a cover section of the housing thereby by a guide surface formed in the upper region of the conveyor. As a result, the bulk material is redirected toward a sensor surface of the measuring device. The measuring device measures the centrifugal force exerted by the harvest flow. The throughput of the harvest conveyed by the conveyor can be determined on the basis of the measurement values for the centrifugal force. The sensor surface has a front edge at the intake side that is bent outward, such that there is break in the transition between the guide surface and the sensor surface. As a result, the flow of the harvest is compromised prior to or when striking the sensor surface, having an effect on the measurement precision.

SUMMARY

A design of a measuring device and a combine harvester are provided with a greater precision in determining the throughput.

In one embodiment, the design of a measuring device for measuring a mass flow composed of bulk material, in particular grains, is provided in a continuous, circulating conveyor, partially enclosed by a housing, having planar conveyor elements, which conveys the bulk material from a lower bulk material receiving area to a higher bulk material delivery area. A substantially circular movement is imposed on the bulk material released from the respective conveyor element in the radial direction of an inner surface of a cover section of the housing by a guide surface formed in the upper region of the conveyor, and as a result, the bulk material can be deflected toward a sensor surface of the measuring device. At least the sensor surface of the measuring device is disposed in the upper region of the conveyor such that there is a tangential course in the transition from the guide surface to the sensor surface, such that the sensor surface is tangential to the movement of the mass flow. The configuration of at least the sensor surface is selected such that it is tangential to the circular movement of the harvest, by means of which the frictional forces exerted by the mass flow on the sensor surface can be compensated for. The resulting frictional force acts on the sensor surface thereby in a tangential direction, such that the resulting frictional force is not, or substantially not, measured by the measuring device, which only measures forces perpendicular to the sensor surface. As a result of this design, the precision of the measurements can be increased, because there is also a continuous, uniform harvest flow in the transition from the guide surface to the sensor surface.

The guide surface can be part of a separate guide section, which adjoins the cover section in the bulk material delivery area. Such a guide section can be easily replaced, and makes it possible to access the sensor surface disposed behind it.

According to an alternative configuration, the guide surfaces can also be part of the cover section. In this embodiment, the guide surface is located in the upper intake area of the conveyor, i.e. prior to the redirection point of the conveyor element.

In particular, the measuring device can be attached to a mount disposed on a surface facing away from the guide surface. The mount can be disposed thereby on the separate guide section. If the guide surface is designed as a part of the cover section, the mount is disposed accordingly on the outside of the cover section.

It is further provided that a spacing is formed between the free end of the respective conveyor element and a cover section encompassing the conveyor in the bulk material delivery area when the conveyor element is in a position in which the spacing to the cover section is smallest, such that the bulk material located on the conveyor element can be nearly entirely released, and a uniform incident flow against the sensor surface can be obtained.

Preferably, when the conveyor element is in a position in which the spacing to the cover section is smallest, a minimum spacing between the free end of the respective conveyor element and a cover section enclosing the conveyor device in the bulk material delivery area is equal to or greater than a spacing between the free end of the conveyor element and its pivot point on a continuous, circulating drive means of the conveyor. It is important to take into account the minimum spacing between the free end of the respective conveyor element and the cover section enclosing the conveyor in the bulk material delivery area in order to give sufficient space to the bulk material delivered by the conveyor elements along a parabolic trajectory such that it is aligned with the shape of the cover, in order to form a uniform, continuous mass flow. When the guide surface and the sensor surface are disposed in or behind the bulk material delivery area of the conveyor, there is the further advantage that the conveyor elements exhibit a lower residual loading when the respective conveyor element has passed through the region in which there is the minimum spacing.

For this, the spacing between the free end of the conveyor element and the pivot point should correspond to at least one half of the spacing of the free end of the conveyor element to the circumference or pitch diameter of an upper redirection element that causes the redirection. In general, the conveyor has a conveyor chain on which the conveyor elements are disposed equidistantly. The redirection of the conveyor chain takes place thereby by means of two chain wheels, which are disposed in the lower and upper regions of the conveyor.

A further aspect is that the minimum spacing between the free end of the conveyor element and the cover section in the bulk material delivery area should be constant. As a result, it is ensured that there is always a uniform striking of the sensor surface with bulk material, which is important for the precision and reproducibility of the measurement.

In one embodiment, the measuring device can include a load cell, by means of which the sensor surface is disposed on the conveyor. By connecting the sensor surface only by means of the load cell, disruptions do not occur through hysteresis of a potential bearing.

The sensor surface can be aligned with the mass flow of the bulk material such that a frictional force resulting from the frictional forces occurring on the surface of the sensor surface acts in a direction parallel to the longitudinal axis of the load cell. Due to the orientation of the resulting frictional force parallel to the longitudinal axis of the load cell, the frictional forces are not, or barely, detected in the measurement. The spacing from the resulting frictional force and the axis of the load cell should be as small as possible for this.

The load cell can be configured as a platform weighing cell thereby. The load cell configured as a platform weighing cell measures the forces applied by the bulk material to the sensor surface independently of a lever with which the sensor surface is disposed on the guide section.

The cover section can preferably have a multi-piece design.

Furthermore, the measuring device may be incorporated into a combine harvester, which has a continuous, circulating conveyor, partially enclosed by a housing, having planar conveyor elements, which conveys bulk material from a lower bulk material receiving area to a higher bulk material delivery area, wherein a substantially circular movement can be imposed on the bulk material released by the respective conveyor element in a substantially vertical direction, and the bulk material can thus be deflected toward a sensor surface of a measuring device for measuring a mass flow comprising bulk material, in particular grains.

It is advantageous thereby when the conveyor configured as a chain conveyor has a tensioning device disposed in the bulk material receiving area of the combine harvester. When the tensioning device is disposed in the bulk material receiving area in the lower region of the conveyor, it is possible to influence the necessary tension of the respective conveyor element in relation to the cover section in the upper region of the conveyor.

BRIEF DESCRIPTION OF THE DRAWINGS

The present invention shall be explained in greater detail below on the basis of exemplary embodiments illustrated in the drawings.

Therein:

FIG. 4 shows a partial view of an alternative design of a measuring device in the upper region of the conveyor.

DETAILED DESCRIPTION

Figure 1:
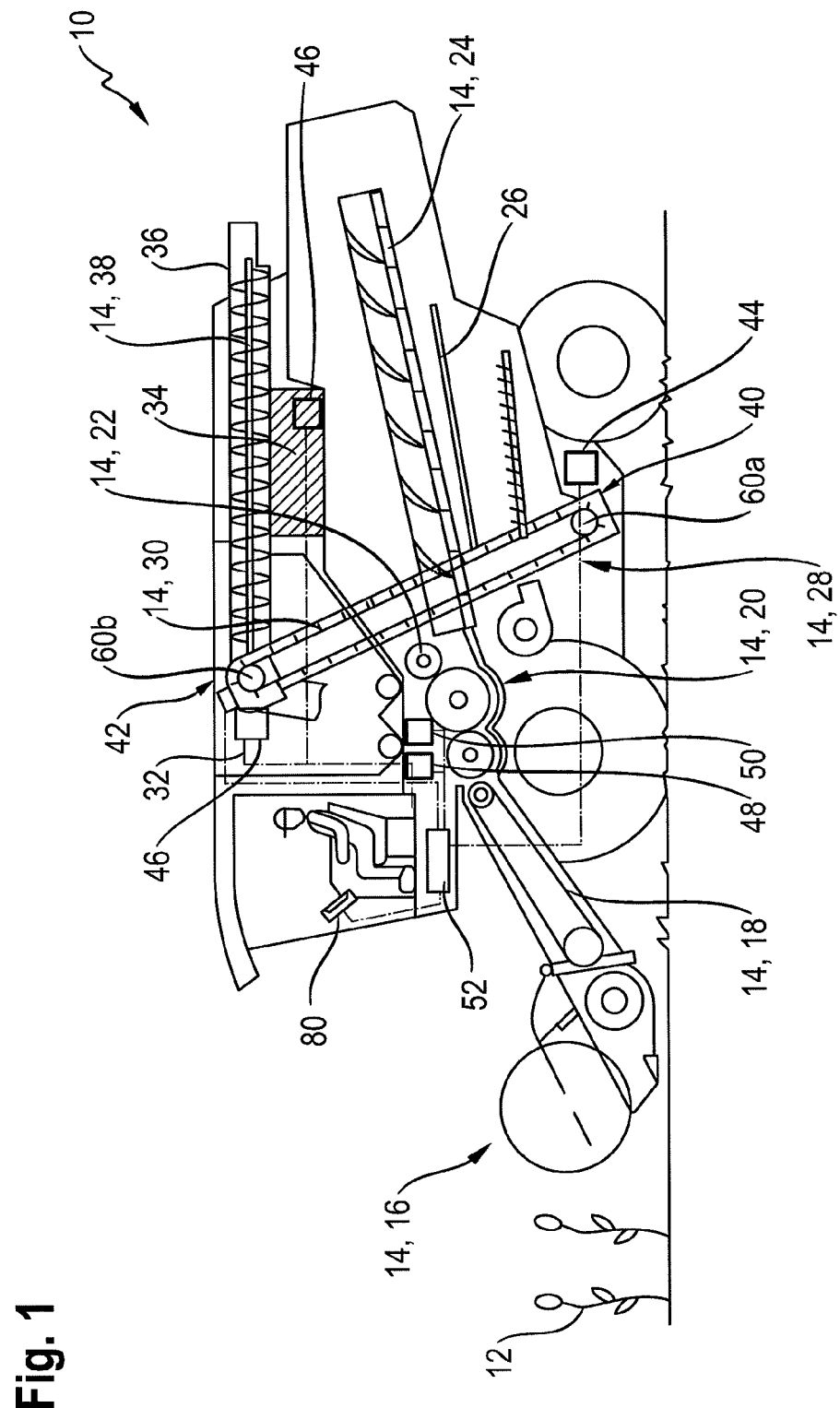
FIG. 1 shows a schematic side view of a combine harvester.

An agricultural harvester is depicted in FIG. 1, which is a self-driving combine harvester 10. The combine harvester 10 has numerous working assemblies 14 for receiving and processing harvest 12. In the depicted combine harvester 10, the working assemblies 14 include a cutting unit 16 for receiving the harvest 12 and a grain conveyor 18 for further transport of the harvest 12 in the combine harvester. From the grain conveyor 18, the harvest 12 is transferred as a harvest flow to a further working assembly 14 in the form of a thresher 20 of the combine harvester 10. The harvest flow is then transported via an impellor 22 to a separator 24 in the form of a separating rotor in order to remove loose grain in the harvest flow into a lower region of the combine harvester. From there, the harvest flow is conveyed via a return pan 26 to a cleansing device 28, which comprises sieves and a fan for cleansing the harvest. The loose grain from the harvest flow is transported by a conveyor 30 configured as a chain conveyor to a grain tank 32. For this, the conveyor 30 receives the cleansed harvest in a lower bulk material receiving area 40 in the lower region of the conveyor 30 and conveys it to a higher bulk material delivery area 42 in the upper region of the conveyor 30. The combine harvester 10 also has an engine 34, which provides the drive power necessary for operating the working assemblies 14 and for driving the combine harvester 10, e.g. by means of a hydrostatic drive (not shown). The working assemblies 14 and the traction drive of the combine harvester 10 are connected to the engine 34 such that power can be transferred thereto for these purposes.

Furthermore, the combine harvester 10 comprises a control and regulating device 52, which is connected to an input/output device 80 in the interior of the cab of the combine harvester 10 for the transmission of signals. Moreover, the control and regulating device 52 is connected to numerous sensors installed in the combine harvester 10, which determine operating and harvest parameters. The sensors installed on or in the combine harvester 10 include, among others, a moisture sensor 44 for determining the moisture content of the, in particular, cleansed harvest, at least one rotational rate sensor 46 for monitoring the drive speed of the engine 34, a tilt sensor 50, and at least one acceleration sensor 48, which determines accelerations acting on the combine harvester 10 caused by driving on a field or result from the engine 34 and other components of the combine harvester 10 that convey the drive forces. The configuration of further sensors that record operating or harvest parameters, which can influence in particular a throughput measurement of the cleansed harvest in the conveyor, is conceivable.

Figure 2:
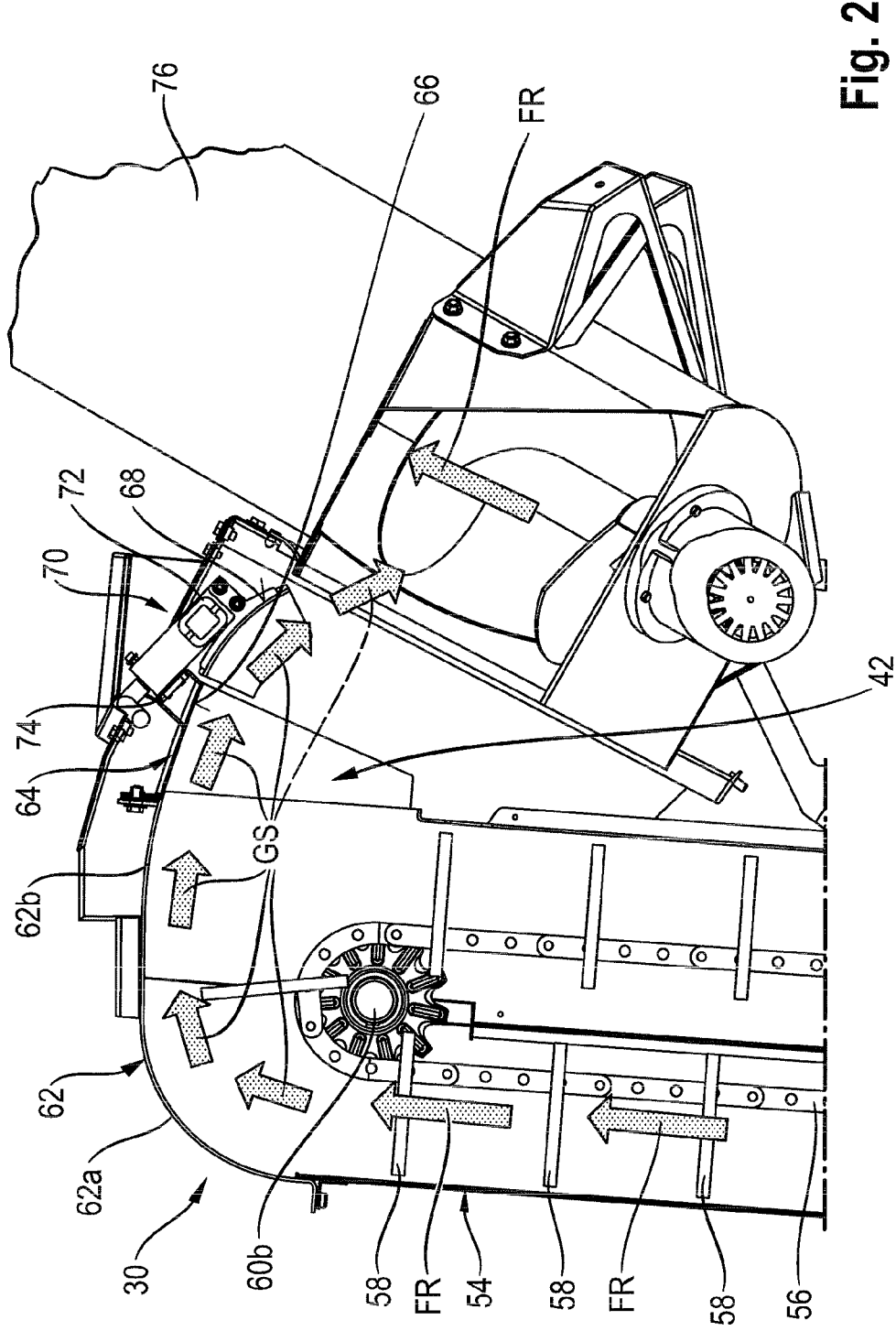
FIG. 2 shows a partial view of a conveyor for the combine harvester, configured as a chain conveyor.

A partial view of the conveyor 30 for the combine harvester 10, designed as a chain conveyor, is depicted in FIG. 2. The conveyor 30 comprises a housing 54, which substantially encloses a continuous, circulating conveyor chain 56, which is driven and redirected about respective lower and upper chain or drive wheels 60a, 60b disposed in the bulk material receiving area 40 and in the bulk material delivery area 42. The housing 54 has openings in both the bulk material receiving area 40 and the bulk material delivery area 42, through which the harvest is fed in and discharged. Planar conveyor elements 58 are disposed at uniform spacings on the continuous circulating conveyor chain 56. The paddle-shaped conveyor elements 58 extend substantially perpendicular to the conveyor chain 56. The direction of conveyance and circulation of the conveyor 30 is indicated by arrows FR. Thus, at least one sensor 46 can be dedicated to the conveyor 30, which monitors the conveyance speed of the conveyor 30. This sensor can be configured as a rotational rate sensor 46, which monitors the rotational rate of a chain wheel 60a, 60b. Alternatively, an optical sensor may be provided, which measures the lateral spacings of the passing conveyor elements 58.

In the bulk material delivery area 42, the upper chain wheel 60b is partially enclosed by a single- or multi-piece cover section 62. The cover section 62 has a first section 62*a* with a substantially circular section-shaped cross section, which partially encompasses the upper chain wheel 60*b* in the radial direction. On the side facing the bulk material delivery area 42, the cover section 62 has a second section with a substantially rectangular cross section. The second section 62*b* has a smaller curvature radius than the first section 62*a* of the cover section 62 thereby.

A guide section 64 adjoins the cover section 62. The guide section 64 is a separate component. A transition 78 between the cover section 62 and the guide section 64 facing the upper chain wheel 60*b* has a tangential course in the direction of the circumference. The configuration of the guide section 64 on the cover section 62 is substantially without steps, such that a tangential transition is formed. The conveyor elements 58 that are substantially horizontal prior to reaching the upper chain wheel 60*b* first transport the harvest from a lower bulk material receiving area 40 to a higher bulk material delivery area 42. Through the redirection of the conveyor elements 58 about the upper chain wheel 60*b*, the harvest lying on the planar conveyor elements 58 is released in the radial direction of the cover section 64. The flight path of the harvest thrown off by the conveyor elements 58 is delimited in the radial direction by the inner surface of the cover section 62 facing the chain wheel 60*b*. The arrows GS illustrate the course of the flow of the bulk material or harvest flow moving along the cover section 62, the guide section 64, and a sensor surface 68.

A measuring device 70 is disposed on the guide section 64. A mount 74 is provided for this on the outside of the guide section 64. A load cell 72 is attached to the mount 74. The sensor surface 68 is disposed on the load cell 72, which has a curved shape corresponding to the flow course GS. The load cell 72 and the sensor surface 68 are components of the measuring device 70. The guide section 64 has a guide surface 66, which faces the upper chain wheel 60*b*. A further transition 78 between the guide surface 66 of the guide section 64 and the sensor surface 68 of the measuring device 70 likewise has a tangential course. The sensor surface 68 of the measuring device 70 is disposed in the upper region of the conveyor 30, such that there is a tangential course in the transition 78 from the guide surface 66 to the sensor surface 68. The measuring device 70 is positioned thereby in the discharge area of the conveyor 30, i.e. after the harvest has entirely left the paddle-shaped conveyor elements 58. The sensor surface 68 has an abrasion-resistant, durable surface, which is distinguished by the surface roughness.

The harvest leaving the conveyor 30 in the bulk material delivery area 42 is conveyed to a grain auger 76, which conveys the harvest into the grain tank 32.

Figure 3:
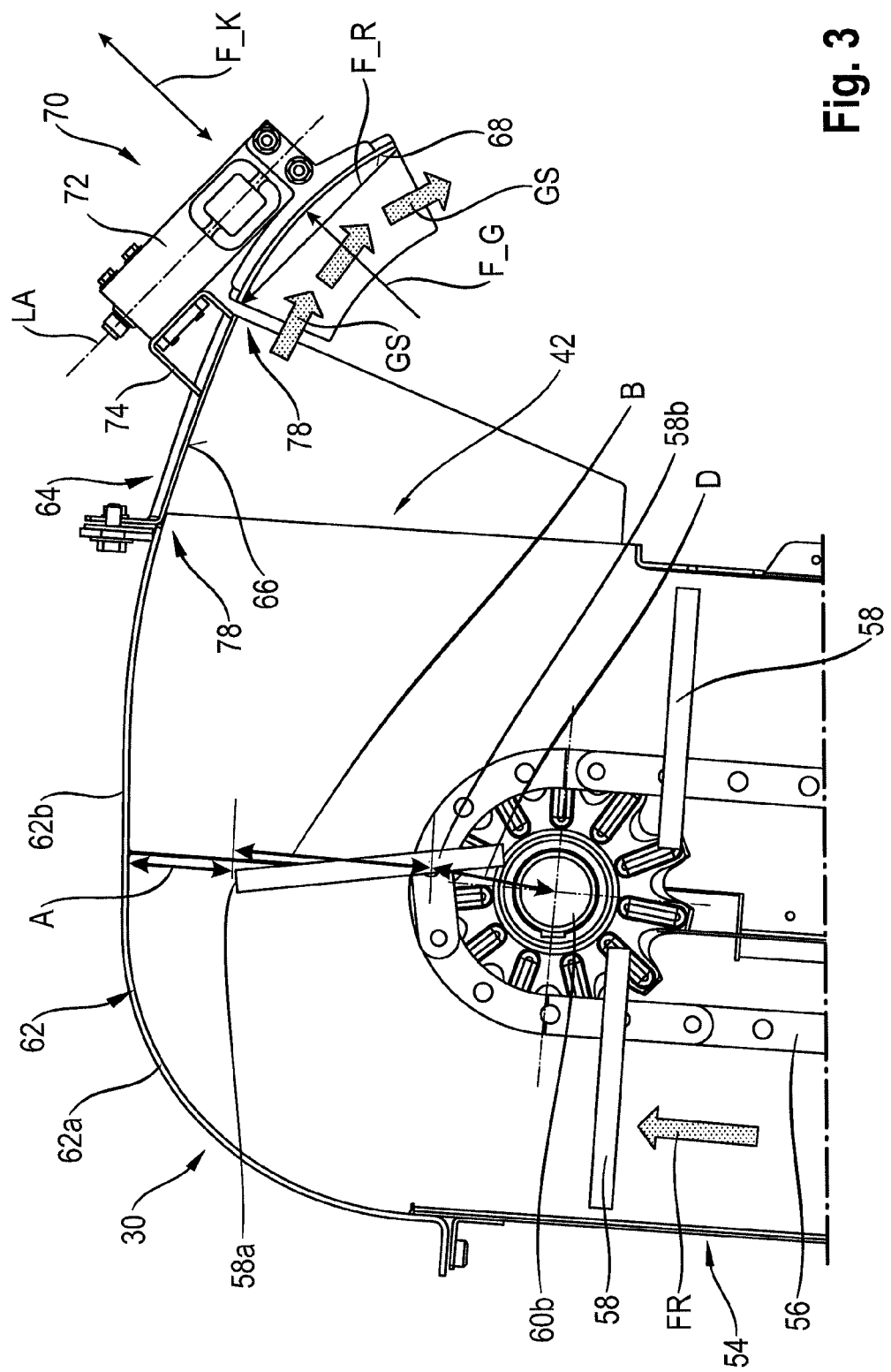
FIG. 3 shows a simplified partial view of the conveyor according to FIG. 2.

The illustration in FIG. 3 shows the upper region of the conveyor 30 according to FIG. 2 in a further simplified depiction. The components of the conveyor 30 located below the upper chain wheel 60*b* as well as the grain auger 76 disposed in the bulk material delivery area 42 are not included in the illustration for purposes of simplification. The illustration shows a conveyor element 58, the free end 58*a* of which is in the zenith of the upper chain wheel 60*b*. In this position of the conveyor element 58, referred to as the zenith, the spacing between the free end 58*a* and the cover section 62 partially encompassing the conveyor 30 in the bulk material delivery area 42 is at a minimum. When the respective conveyor element 58 reaches this position, it is to be ensured that the harvest located on the conveyor element 58 has been nearly entirely delivered. For this, the spacing between the free end 58*a* of the respective conveyor element 58 and the cover section 62 encompassing the conveyor 30 in the bulk material delivery area 42 when the conveyor element 58 is in the position in which the spacing to the cover section 62 is at a minimum, is selected such that bulk material located on the conveyor element 58 can be delivered almost entirely, and can flow against the sensor surface 68 in a uniform manner. For this, the cover section 62 and the free end 58*a* of the respective conveyor element 58 located in the zenith exhibit a minimum spacing A. The minimum spacing A is equal to or smaller than a spacing B between the free end 58*a* of the conveyor element 58 and a pivot point 58*b* on the continuous, circulating conveyor chain 56 of the conveyor 30. The spacing B corresponds thereby to one half of the spacing of the free end 58*a* of the conveyor element 58 to the pitch diameter D of the upper chain wheel 60*b*. In order to keep the minimum spacing A constant, it is provided that a tension device for tensioning the conveyor chain is disposed in the lower region of the conveyor 30.

Furthermore, the design of the measuring device 70 can be derived from the illustration in FIG. 3. The measuring device 70 is disposed on the guide section 64 by a housing enclosing the load cell 72 on the mount 74. The sensor surface 68 is connected to the conveyor 30 only by the load cell 72. In this manner, disruptions through hysteresis of a potential bearing are eliminated. The transitions 78 between the second section 62*b* of the cover section 62 and the guide section 64, as well as the guide section 64 to the sensor surface 68 of the measuring device 70 have a tangential course, as explained above. The respective tangential courses of the transitions 78 ensure a tangential incidence of the harvest flow at the sensor surface 68.

The load cell 72 is designed as a platform weighing cell. This type of load cell 72 measures the forces acting on the sensor surface 68 independently of a lever resulting from the spacing between the attachment of the mount 74 and the arrangement of the sensor surface on the load cell 72. The harvest flowing along the sensor surface 68 generates a centrifugal force subject to tilt and gravitational effects, resulting from its redirection, which is illustrated by a force vector F_G. The load cell 72 is disposed such that the measurement direction of the measuring device 70 and the resulting centrifugal force F_G acting on the sensor surface 68 are oriented in the same direction. The load cell 72 records a measured force illustrated by a resulting force vector F_K. The orientation of the force vector F_K also represents the measurement direction of the load cell 72. The frictional forces of the passing harvest flow resulting from the friction occurring on the surface of the sensor surface 68 are illustrated by a force vector F_R. The course of the force vector F_R of the resulting frictional forces is parallel to the longitudinal axis LA of the load cell 72, or perpendicular to the measurement direction of the load cell 72, such that the resulting frictional forces are not included in the force measurement for determining the throughput. This results in an arrangement of the sensor surface 68 that compensates for frictional forces.

A method for determining a mass flow including cleansed harvest that is conveyed by the conveyor 30 into the grain tank 32 is described below. As explained above, the cleansed harvest delivered by the conveyor 30 from the guide surface 66 of the guide section 64 provided in the bulk material delivery area 42 is deflected toward the sensor surface 68 of the measuring device 70. The mass of the harvest flow is determined by the measurement of the resulting centrifugal force (force vector F_G) exerted on the sensor surface 68 of the measuring device 70, wherein at least two parameters that have an effect on this force measurement are compensated for. Primarily, due to the special arrangement of the load cell 72, the resulting frictional forces (force vector F_R) applied to the sensor surface 68 by the harvest flow are compensated for.

Moreover, it is provided that at least one second parameter having an effect on the force measurement is compensated for. Among others, external mechanical forces acting substantially vertically on the conveyor 30, a rotational rate decrease with respect to a decrease in the conveyance speed of the conveyor 30, and a tilting of the measuring device 70 are to be regarded as parameters that have an effect on the force measurement. Fundamentally, the harvest, as well as properties such as the moisture content of the harvest, are to be taken into account. Depending on the harvest, the weight and size of the individual particles of the cleansed harvest have an effect on the flow behavior, as well as on the resulting centrifugal force F_G exerted on the sensor surface 68. The moisture content of the harvest can have an effect on the speed with which the harvest flows from the respective conveyor element 58 along the guide section 64 and along the sensor surface 68. Furthermore, the moisture content can have an effect on the adhesive behavior of the harvest.

In order to take these effects into account when determining the mass flow on the basis of the force measurement by the measuring device 70, the control and regulating device 52 is connected in a signal transmitting manner to the sensors 44, 46, 48. The respective sensor 44, 46, 48 issues a signal representing the respective measurement that is to be monitored, which is received by the control and regulating device 52, and evaluated and taken into account with respect to its influence on the resulting force F_K measured by means of the load cell 72.

Thus, a temporary reduction, i.e. a decrease in the rotational rate, of the engine 34 can be detected by means of the rotational rate sensor 46. The temporary rotational rate reduction of the engine 34 results in a rotational rate reduction, or a reduction in the conveyance speed, respectively, of the conveyor 30. The resulting speed reduction of the harvest flow flowing along the sensor surface 68, indicating a reduction of the throughput, is offset accordingly by the control and regulating device 52. In this manner, the resulting centrifugal force F_G applied to the sensor surface 68 by the harvest flow is determined taking into account the speed reduction during the force measurement by the measuring device 70 in order to determine the throughput.

Another parameter that has an effect on the determination of the mass flow on the basis of the force measurement by the measuring device 70 is the moisture content of the harvest. The moisture content of the harvest during the harvesting varies, depending on the harvest time and the external environmental conditions, such as weather. With an increase in the moisture content, the overall weight of a grain can increase. The important thing is the effect on the speed with which the harvest flows after being thrown from the respective conveyor element 58, as well as the effects of friction. Accordingly, the resulting forces exerted on the sensor surface 68 by the harvest passing over it, the resulting centrifugal force F_G and the resulting frictional force, may change even though the throughput remains constant. In order to compensate for these effects, the detection characteristic of the measuring device 70 is modified as a function of the moisture content of the harvest. A moisture sensor 44 can be disposed in the combine harvester 10, as described above, in order to determine the moisture content of the cleansed harvest. This moisture sensor 44 is preferably disposed in the region of the bulk material receiving area 40. Alternatively, a manual determination of the moisture content of the harvest can be carried out at the start of the harvesting. The results of this manual moisture content determination can be transmitted to the control and regulating device 52 by means of an input/output device 80, in order to adjust the detection characteristic of the measuring device 70 accordingly.

During the harvesting by the combine harvester 10, a longitudinal or transverse tilting of the combine harvester 10 may take place, or the driving dynamics may be subjected to an acceleration change, due to the conditions of the ground that is to be processed. The load cell 72 only measures the resulting centrifugal force F_G acting on the sensor surface 68 to its full extent, however, when it acts precisely in the measurement direction of the load cell 72. If the angle of the load cell 72 changes with respect to the combine harvester 10, then the gravitational force acts on the sensor surface 68 and on the harvest flow at a different angle. The change to the resulting centrifugal force F_G and the resulting force F_K measured by the load cell 72 under the influence of the tilt of the combine harvester 10 are offset accordingly, and thus compensated for by the force measurement in the determination of the throughput, or yield. This compensation can take place internally, in the measuring device 70. Alternatively, a tilt sensor 50 is disposed on or in the combine harvester 10. The signals received from the tilt sensor 50, representing a longitudinal or transverse tilting, are transmitted to the control and regulating device 52, and evaluated. The control and regulating device 52 compensates for the effects of the tilting on the determination of the throughput via these tilt values.

Furthermore, external mechanical forces acting on the conveyor 30 in a substantially vertical direction have an effect on the determination of the throughput. In this case, these are accelerating forces, which occur when driving on the field, or as a result of the drives 34 of the combine harvester 10. In the latter case, these are oscillations transferred to the body of the vehicle by the drive and the drive elements of the combine harvester, which are also introduced into the conveyor 30. These forces also act on the measuring device 70, such that deviations arise in the resulting forces F_K measured by the load cell 72 at the point in time when the acceleration takes place. Thus, driving through a depression in the ground may lead to an abrupt acceleration in a substantially vertical direction, having an effect on the measurement of the resulting centrifugal force F_G exerted by the harvest as it flows over the sensor surface 68. This additional force caused by the acceleration is likewise compensated for. This compensation can also take place thereby internally, in the measuring device 70. Alternatively, an acceleration sensor 48 is disposed in or on the combine harvester 10. Its signals are likewise received and evaluated by the control and regulating device 52, in order to be able to compensate for the effect of the acceleration on the force measurement.

Appropriate algorithms or detection characteristics, which can be oriented on the type of harvest or the type of harvester, are stored in a retrievable manner in a memory unit of the control and regulating device 52 in order to be able to compensate for these effect variables.

An alternative design of the measuring device 70 is illustrated in FIG. 4. According to this embodiment, the sensor surface 68 is located in the first section 62a of the cover section 62. The guide surface 66 is part of the first section 62 of the cover section 62 thereby. Because it is disposed in the first section 62a, the measuring device 70, i.e. the load cell 72 and the sensor surface 68, is located outside the grain tank 32. According to this embodiment, the guide surface 66 is located in the upper intake area of the conveyor 30, i.e. prior to the redirection point of the conveyor elements 58. The advantage with this arrangement, or positioning, of the sensor surface 68 is that the harvest is subjected to a strong deflection due to the stronger curvature of the sensor surface 68. Large forces thus act on the sensor surface 68, such that even low harvest throughputs can be effectively measured. Moreover, due to the small spacing between the free ends 58a of the conveyor elements 58 and the sensor surface 68, the harvest is actively conveyed in this region. This leads to a lower frictional effect in the measurement of the mass flow. Furthermore, the active conveyance of the harvest ensures a continuous harvest flow, which is subjected to the effects of gravity to a lesser extent.

This arrangement of the measuring device 70 outside the grain tank 32 requires a measure for preventing harvest losses through discharge into a region between the cover section 62 and the measuring device 68.

One possible measure is to provide a circumferential seal on the sensor surface 68 with respect to the first section 62a, in order to prevent harvest losses. It is also conceivable to maintain a gap between the sensor surface 68 and the first section 62a that is so small that it is impossible for harvest to pass through it. An alternative measure could also be the collecting of harvest passing through the gap between the sensor surface 68 and the first section 62a by a device provided for this, and the returning of said harvest into the conveyor.

In order to ensure the throughput measurement, despite the circumferential seal connecting the sensor surface 68 to the first section 62a of the cover section 62, the material used for the seal is elastic. The elastic material of the seal allows for a slight displacement of the sensor surface 68 in the measurement direction of the load cell 72, caused by the resulting centrifugal force F_G. The centrifugal force F_G transferred by the harvest flow to the sensor surface 68 is measured through the deflection of the sensor surface 68 in the measuring device in relation to the first section 62a. It should be taken into account here that the material used for the circumferential seal exerts a resulting return force F_A that is counter to the resulting centrifugal force F_G. This resulting return force F_A is compensated for accordingly with the knowledge of the material specific characteristics of the seal as well as the geometric factors of the arrangement of the load cell 72. A further aspect of this embodiment is the production of the cover section 62 from a plastic.

LIST OF REFERENCE SYMBOLS

10 combine harvester
12 harvest
14 working assembly
16 cutting unit
18 grain conveyor
20 thresher
22 impeller
24 separator
26 return pan
28 cleansing device
30 conveyor
32 grain tank
34 engine
40 bulk material receiving area
42 bulk material delivery area
44 moisture sensor
46 rotational rate sensor
48 acceleration sensor
50 tilt sensor
52 control and regulating device
54 housing
56 conveyor chain
58 conveyor element
58a free end of 58
60a lower chain wheel
60b upper chain wheel
62 cover section
62a first section of 62
62b second section of 62
64 guide section
66 guide surface
68 sensor surface
70 measuring device
72 load cell
74 mount
76 grain auger
78 tangential transition
80 input/output device
A minimum spacing
B spacing
D pitch diameter of 60b
FR conveyance direction
GS flow course
F_G force vector centrifugal force
F_R force vector frictional force
F_K force vector acceleration
F_A force vector return force

The invention claimed is:

1. A device for measuring a mass flow composed of bulk material, the device comprising:
a continuous, circulating conveyor, enclosed in part by a housing, comprising planar conveyor elements, which conveys the bulk material from a first bulk material receiving area to a second bulk material delivery area, wherein a substantially circular movement course is imposed on the bulk material delivered by a planar respective conveyor element in a substantially radial direction of an inner surface of a cover section of the housing by a guide surface formed in an upper region of the conveyor; and
a measuring device comprising a sensor surface, wherein at least the sensor surface is disposed in the upper region of the conveyor,
wherein the planar conveyor elements and the guide surface are configured to deflect the bulk material toward the sensor surface of the measuring device such that there is a tangential course in a transition from the guide surface to the sensor surface;
wherein the sensor surface is tangential to the movement course of the mass flow; and
wherein the sensor surface is positioned relative to the planar conveyor elements such that the bulk material is released from the planar conveyor elements prior to impact on the sensor surface.

2. The device according to claim 1, wherein the guide surface is part of a separate guide section, which adjoins the cover section in the second bulk material delivery area.

3. The device according to claim 1, wherein the guide surface is part of the cover section.

4. The device according to claim 1, wherein the measuring device is attached to a mount disposed on a surface facing away from the guide surface.

5. The device according to claim 1, wherein a spacing between a free end of the respective planar conveyor element and the cover section enclosing the conveyor in the second bulk material delivery area, when the respective planar conveyor element is in a position in which the spacing to the cover section is at a minimum, is selected such that the bulk material located on the respective planar conveyor element can be nearly entirely delivered, wherein a uniform flow is provided against the sensor surface.

6. The device according to claim 5, wherein a minimum spacing (A) between the free end of the respective planar conveyor element and the cover section enclosing the conveyor in the second bulk material delivery area, when the respective planar conveyor element is in a position in which the spacing to the cover section is at the minimum, is equal to or smaller than a spacing (B) between the free end of the conveyor and its pivot point on a continuous, circulating drive means of the conveyor.

7. The device according to claim 6, wherein the minimum spacing (A) between the free end of the respective planar conveyor element and the cover section is constant in the second bulk material delivery area.

8. The device according to claim 1, wherein the measuring device comprises a load cell coupling the sensor surface to the conveyor.

9. The device according to claim 8, wherein the load cell comprises a platform weighing cell.

10. The device according to claim 8, wherein the sensor surface is oriented in relation to a flow course (GS) of the mass flow of the bulk material, such that a frictional force (F_R) resulting from friction occurring on the sensor surface acts in a direction parallel to a longitudinal axis of the load cell.

11. The device according to claim 1, wherein the cover section has a multi-piece design.

12. A combine harvester comprising the device of claim 1.

13. The combine harvester according to claim 12, wherein the conveyor comprises a chain conveyor having a tensioning device disposed in the first bulk material receiving area.

14. The device according to claim 1, wherein the sensor surface has a curved shape corresponding to a course of flow of the bulk material.

15. The device according to claim 1, wherein the cover section includes a first section with a substantially circular section-shaped cross section and a second section downstream of the first section with a smaller curvature radium than the first section.

16. The device according to claim 15, wherein the guide surface includes a guide section in between the second section and the sensor surface; and
wherein transitions between the second section of the cover section and the guide section to the sensor surface have a tangential course.

17. The device according to claim 1, wherein the device is installed in a combine harvester;
further comprising a tilt sensor configured to sense a tilt of the combine harvester; and
wherein an indication of the mass flow is compensated for based on the sensed tilt of the combine harvester.

18. The device according to claim 1, wherein the device is installed in a combine harvester;
further comprising an acceleration sensor configured to sense acceleration of the combine harvester; and
wherein an indication of the mass flow is compensated for based on the sensed acceleration of the combine harvester.

* * * * *